United States Patent [19]
Tamches

[11] 3,964,021
[45] June 15, 1976

[54] PREPROCESSING SYSTEM AND METHOD FOR PATTERN ENHANCEMENT

[75] Inventor: Ilan Tamches, Greenbelt, Md.

[73] Assignee: Visionetics Limited Partnership, Riverdale, Md.

[22] Filed: July 27, 1973

[21] Appl. No.: 383,282

[52] U.S. Cl. .................................... 340/146.3 MA
[51] Int. Cl.² ......................................... G06K 9/12
[58] Field of Search .......... 340/146.3 MA, 146.3 F, 340/146.3 T, 146.3 H, 146.3 AQ

[56] References Cited
UNITED STATES PATENTS

| | | | |
|---|---|---|---|
| 3,016,518 | 1/1962 | Taylor | 340/146.3 MA |
| 3,088,096 | 4/1963 | Steinbuch | 340/146.3 MA |
| 3,187,304 | 6/1965 | Taylor | 340/146.3 MA |
| 3,701,095 | 10/1972 | Yamaguchi et al. | 340/146.3 MA |

OTHER PUBLICATIONS
Arkadev and Braverman, "Computers and Pattern Recognition," Thompson Book Co., 1967. p. 74.

Fukushima et al., "An Electronic Model of the Retina," Proc. of the I.E.E.E., Dec., 1970. pp. 1950–1951.

*Primary Examiner*—Leo H. Boudreau
*Attorney, Agent, or Firm*—Finnegan, Henderson, Farabow & Garrett

[57] ABSTRACT

There is disclosed embodiments of a preprocessing system and method for enhancing a pattern in a spatially-modulated scene. First, the scene is filtered by a spatial band-pass filter which processes all points on the scene in parallel and simultaneously to remove noise and background textures. Next, a line element peak detector processes all points on the filtered pattern in parallel and simultaneously to provide peak signals whose locus defines line elements forming edges or skeletons of the input pattern.

36 Claims, 22 Drawing Figures

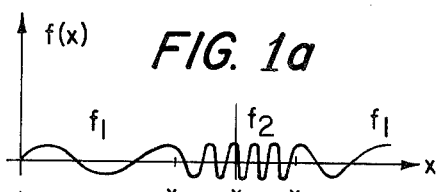
FIG. 1a
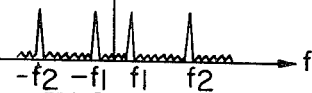
SPATIAL POWER SPECTRUM
OF THE FUNCTION
FIG. 1b
SPATIAL POWER SPECTRUM
OF THE FILTER
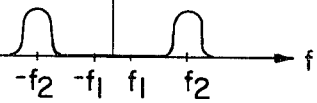
FIG. 1c
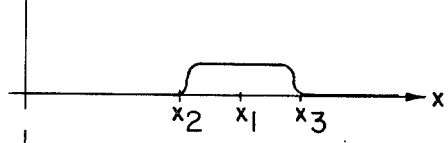
FIG. 1d
FIG. 1e
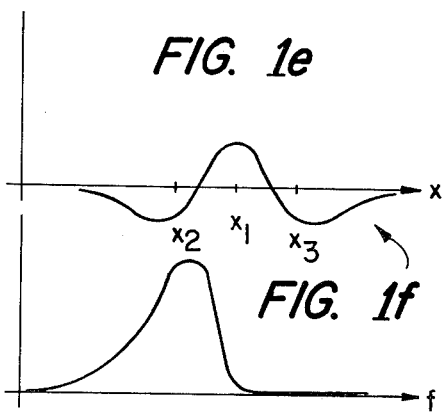
FIG. 1f
FIG. 1g
FIG. 1h
FIG. 3
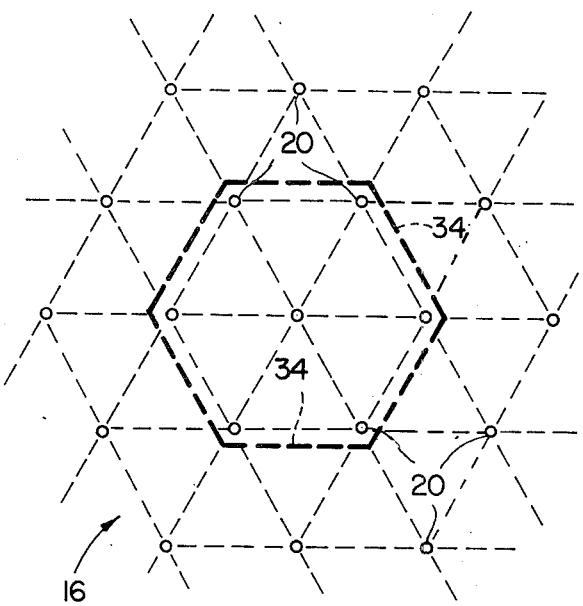
FIG. 15
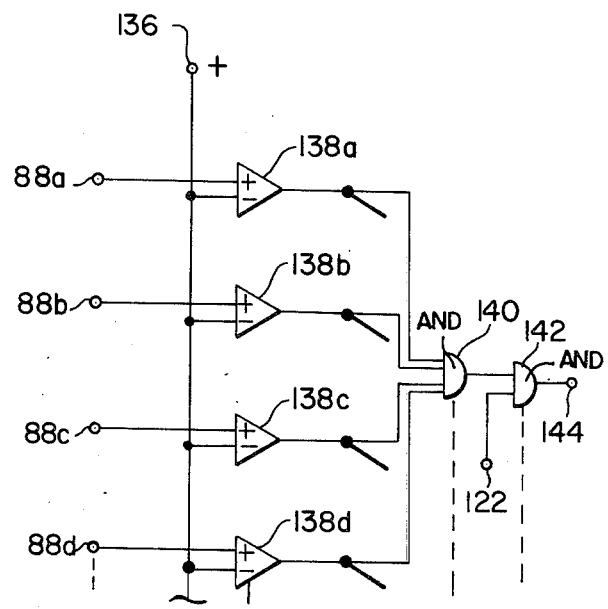

PREPROCESSING SYSTEM AND METHOD FOR PATTERN ENHANCEMENT

BACKGROUND OF THE INVENTION

The present invention relates broadly to a preprocessing system and method for an optical pattern recognition system, and more particularly to a pattern enhancement system and method for an optical pattern processing or character recognition system.

The practicality of optical character recognition systems has been established by the number of machines in successful operation, although most have a limited capability and are used for only a limited or highly standardized character set. Typically, these machines are provided with a preprocessing system whose function is to treat the original input patterns or images so that the main problem, namely, that of recognition or identification, is mitigated. Generally these preprocessing systems have been categorized as those which attempt to render the pattern free of imperfections, and those which enhance the pattern, including those that are commonly called skeletonizing systems.

The enhancement of features such as edges or skeletons by prior art techniques, while improving the presentation of patterns for subsequent recognition, have been done on a less than optimum basis. Generally, the time consumed in enhancing the pattern is lengthy, the signal-to-noise ratio between the output pattern and its background is low, or the apparatus necessary to obtain enhancement is complex and expensive, to illustrate a few examples of the problems of the prior art.

It has been previously proposed to process the total pattern or subsections of the total in parallel in order to skeletonize the pattern in simulation of the operation of the human eye. By "parallel" is meant that all points in the pattern are sensed and presented to the processing apparatus simultaneously, in contrast to a serial or stepped examination of each point in the pattern. Such parallel preprocessing has in one form required an iteration technique in which the pattern is continually eroded until it stabilizes, i.e., no further points on the boundary can be removed. In an alternative approach, iteration is not used, and instead the outputs of the sensor propagate in parallel through layers of electrical circuits to obtain an enhanced or extracted pattern. While this latter approach appears to simulate the human visual system, in actuality, the time required to propagate the input signal to conclusion is quite lengthy, e.g., two seconds or higher. Both the iteration and parallel-propagation approaches are therefore not ideal from the standpoint of being adaptable with present-day, electronic systems, such as optical character recognition systems, where the data to be processed is voluminous and must be handled on a high-speed and essentially real-time basis.

SUMMARY OF THE INVENTION

The present invention combines aspects of both types of preprocessing systems in that various pattern degradation effects and redundant background textures are removed and the geometrical center of the pattern (the skeleton) is extracted. Alternatively, the boundaries of the pattern (the edges) are detected instead of or jointly with skeletonization.

By analogy with communication theory concepts, what is being viewed is treated as a spatially-modulated scene. This scene is applied to a receiver and converted in parallel by light-energy-responsive sensors into electrical signals. All points on the scene are processed simultaneously. Demodulation is by way of spatial filtering operations which remove various pattern degradation effects and redundant background textures. A detector next locates the boundaries (edges) and/or geometrical center (skeleton) of the pattern to provide output signals which are an enhancement of the input pattern. These signals can then be applied to known pattern recognition systems to provide an improved overall pattern recognition performance.

This preprocessing system truly simulates human visual properties in its fully parallel reception, spatial-filtering characteristics, and processing on a high-speed basis. The enhanced output pattern which it provides can be used with a wide range of optical pattern rcognition systems, including but not limited to page readers, mail processors, textile fault detection, aerial reconnaissance, and satellite picture enhancement. The preprocessing system can detect light patterns on a dark background, and vice versa, provided sufficient contrast exists for the sensors to distinguish between the two.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the optical pattern preprocessing system of this invention enhances a pattern in a spatially-modulated scene and comprises photoelectric means for converting the light energy received from the scene into electrical signals proportional to the intensity of the received light and providing a plurality of outputs in parallel, a spatial filter for deriving signals representative of an enhanced pattern with respect to the carrier in the spatially-modulated scene, said filter having a plurality of signal inputs, each input connected to at least one of said photoelectric means outputs, and a plurality of outputs, and means for peak detecting the outputs of said spatial filter by selectively comparing the signal at each of a plurality of pairs of outputs with the signals at at least one other pair of outputs adjacent thereto, the output of said peak detector detecting peaks whose locus define line elements forming an output pattern which is an enhanced version of the input.

Preferably, said spatial filter is a spatial band-pass filter which comprises a first low-pass spatial filter having a plurality of nodes forming the band-pass filter inputs, and having a first filter bandwidth, a second low-pass spatial filter having a plurality of nodes forming the inputs to said second low-pass filter, said plurality of nodes being connected to the plurality of nodes of said first low-pass spatial filter, and having a second filter bandwidth, and means for obtaining the difference between the signals appearing at the nodes of the first low-pass spatial filter and the nodes of the second low-pass spatial filter.

In accordance with the purpose of the invention, as embodied and broadly described herein, the method of preprocessing an optical pattern in a spatially-modulated scene comprises the steps of converting the light energy received from said scene into electrical signals proportional to the energy of the received light, and providing said signals at a plurality of first outputs in parallel, simultaneously band-pass filtering in the spatial domain the signals provided at said parallel first outputs for deriving further signals representative of an enhanced optical pattern with respect to the carrier in the spatially-modulated scene, and providing said further signals at a plurality of second outputs in parallel, simultaneously peak detecting the further signals provided at said parallel second outputs and providing a series of peak output signals whose locus defines line elements representative of an output pattern enhanced with respect to said input and derived immediately upon the receipt of light energy from said scene.

The invention consists in the novel circuits, parts, constructions, arrangements, combinations and improvements shown and described. The accompanying drawings, which are incorporated in and constitute a part of this specification, illustrate embodiments of the invention and, together with the description, serve to explain the principles of the invention.

BRIEF DESCRIPTION OF THE DRAWINGS

FIGS. 1a – 1h show curves representative of a function and its treatment in the spatial and spatial frequency domains, and used as an aid in understanding the present invention;

Figure 4:
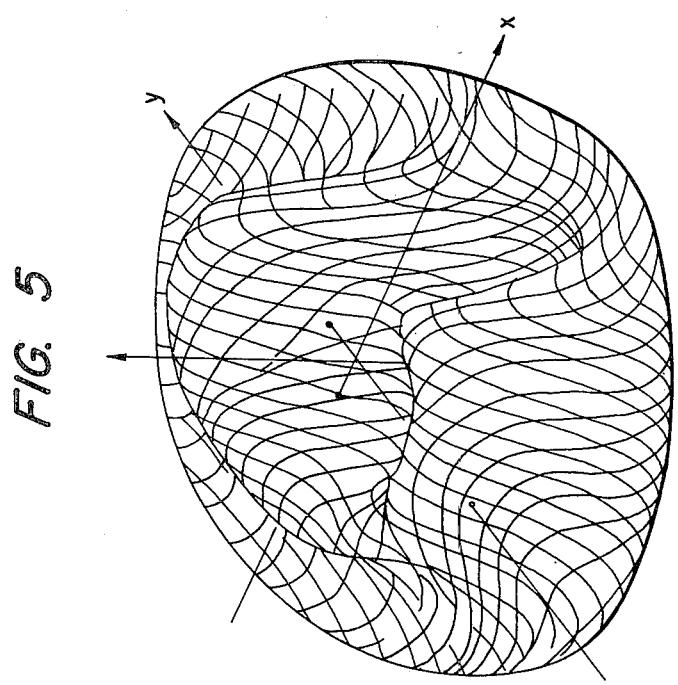
Figure 5:
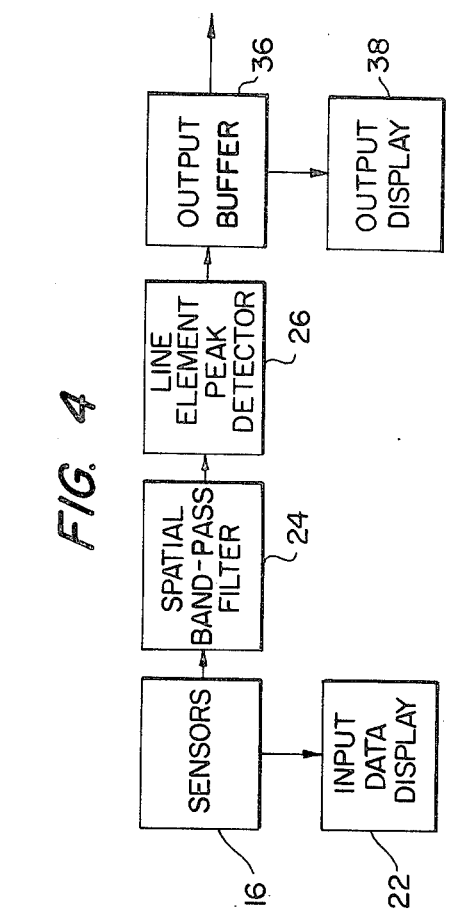
Figure 2:
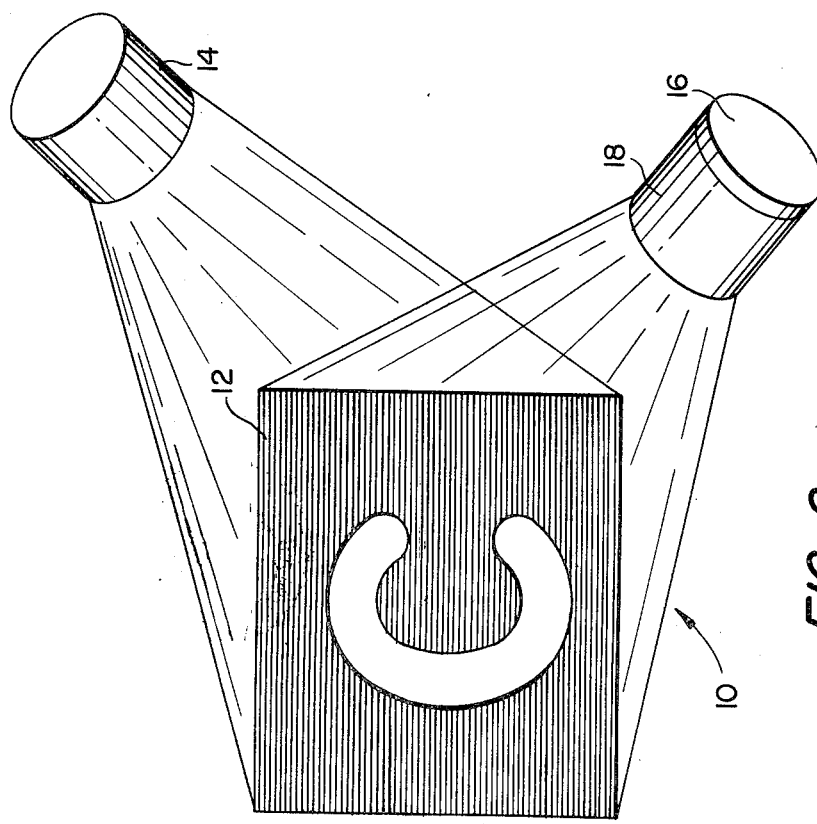
FIG. 2 is an example of an illuminated spatial scene in two dimensions which is to be preprocessed by the present invention, and photoelectric means for receiving the light reflected from the scene.
Figure 7:
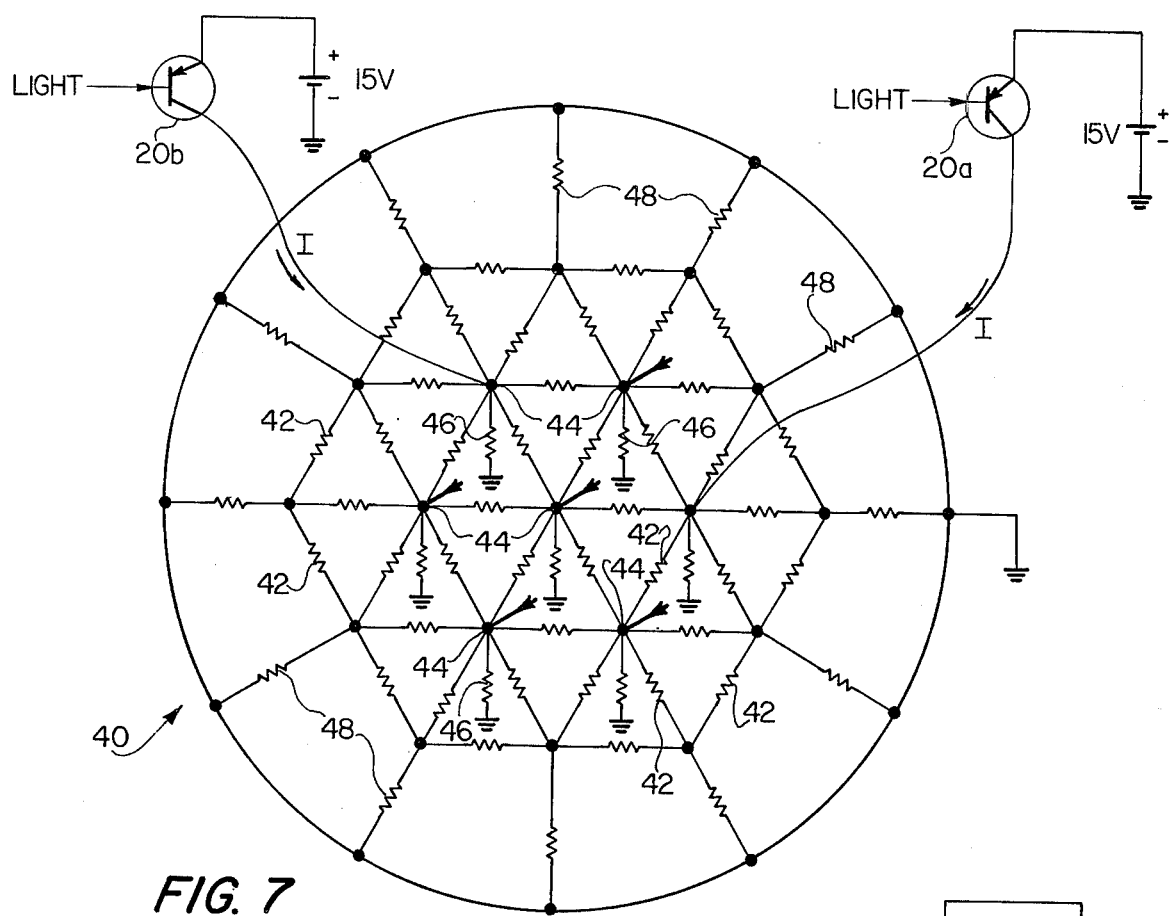
Figure 6:
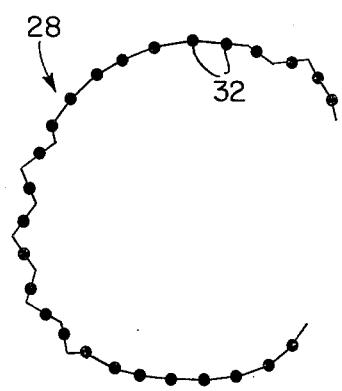
Figure 10:
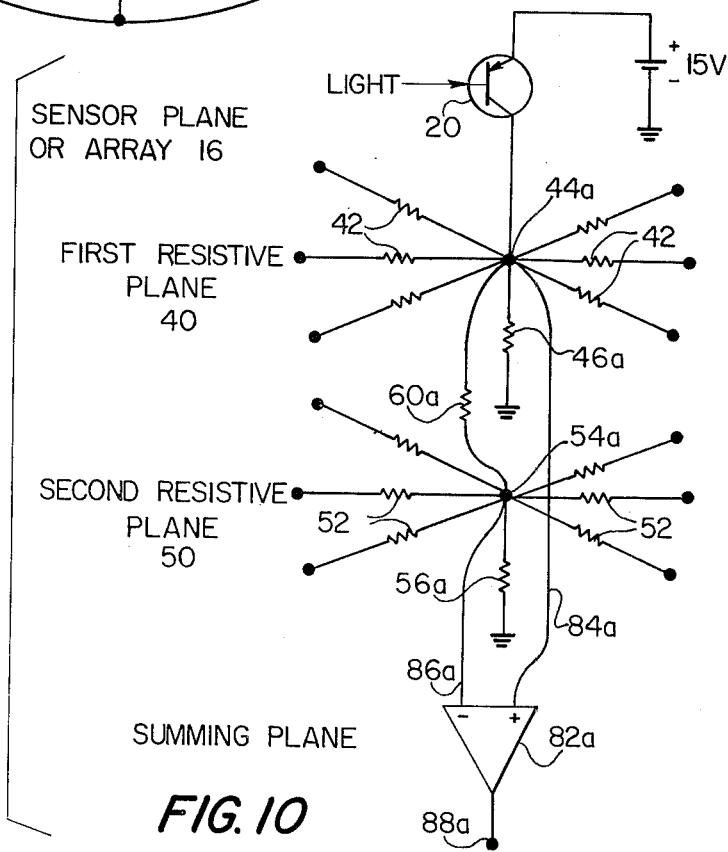
Figure 8:
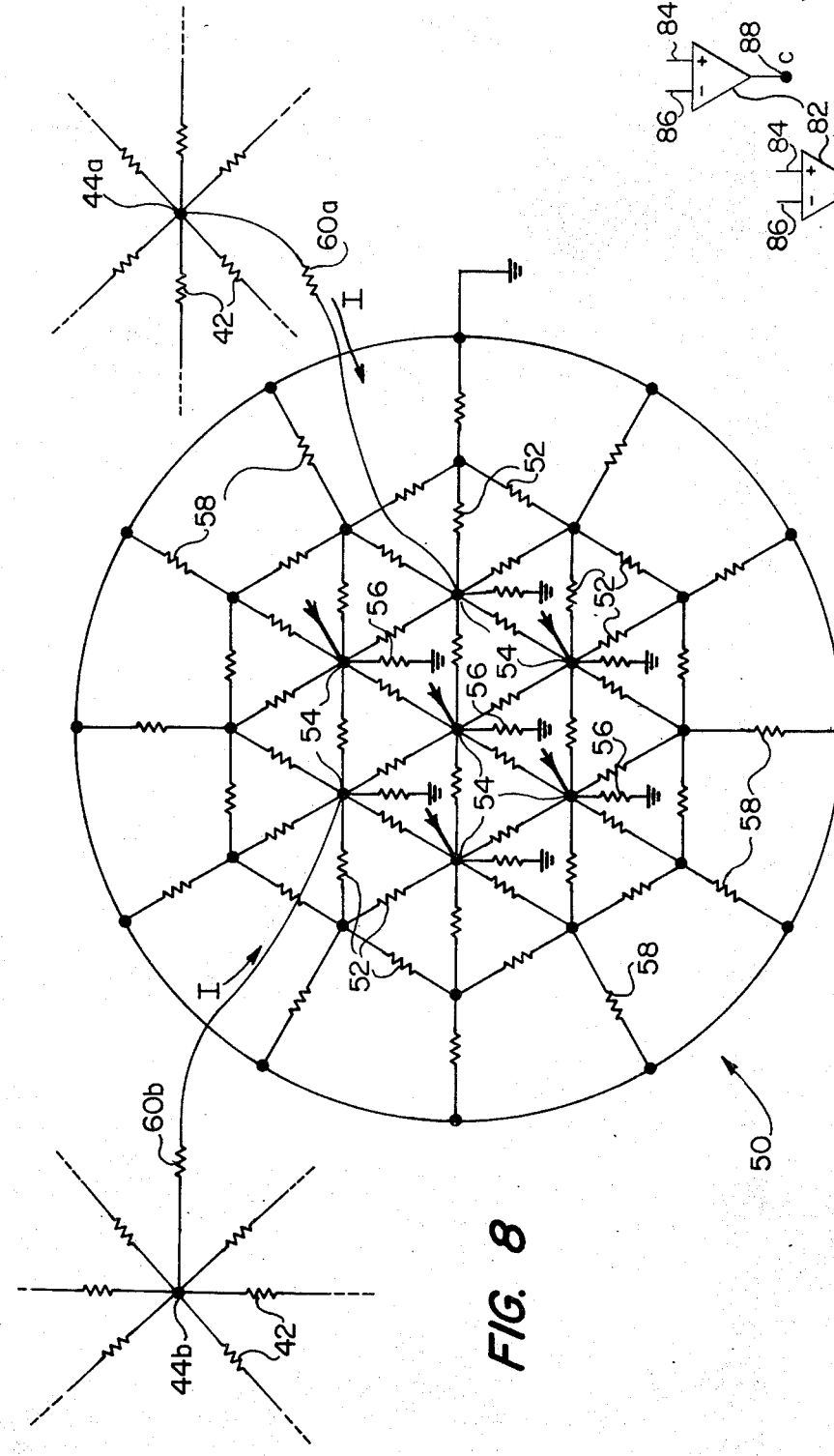
Figure 9:
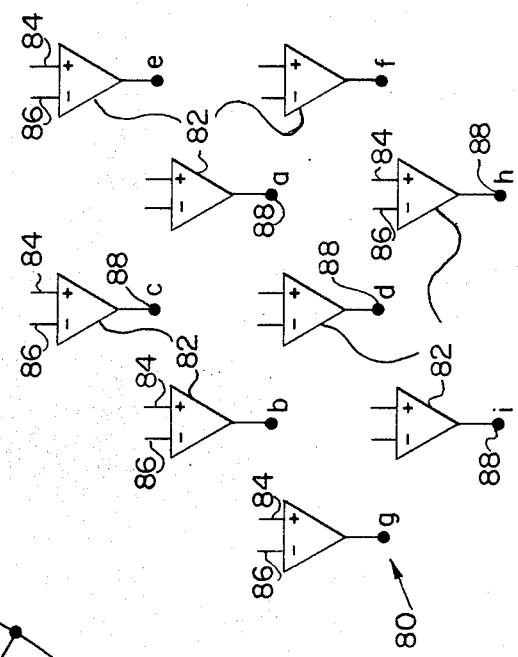
Figure 12:
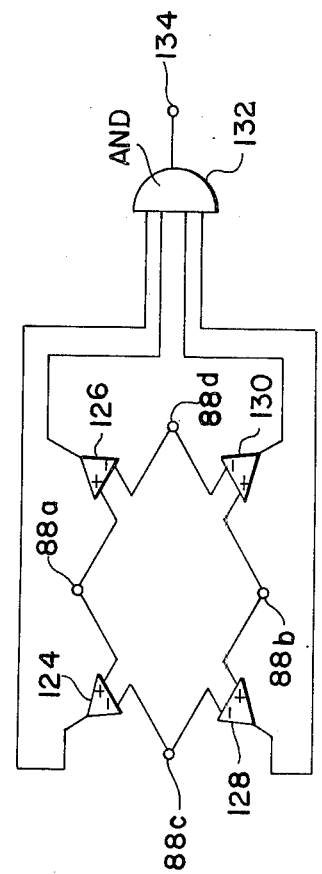
Figure 14:
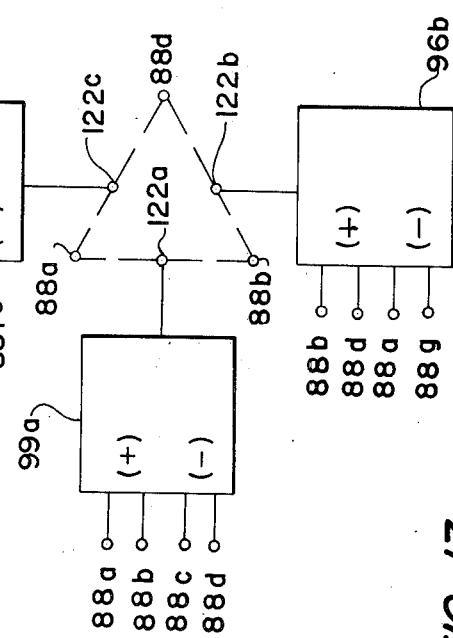
Figure 11:
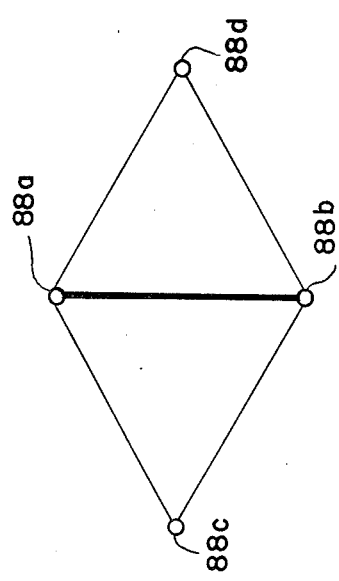
Figure 13:
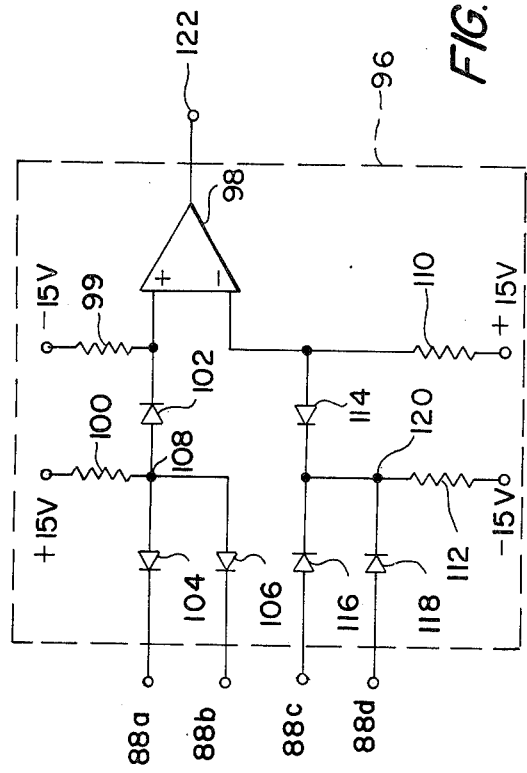

FIF. 3 shows the preferred, planar, hexagonal arrangement of sensors forming the photoelectric means of this invention;

FIG. 4 is a general block diagram of the preferred system embodiment of this invention;

FIG. 5 is a representation of the filtered scene of FIG. 2 in perspective;

FIG. 6 is a representation of a skeletonized output of the scene of FIG. 2 after line element peak detection;

FIG. 7 is a preferred embodiment of one filtering plane employed in the band-pass filter of this invention;

FIG. 8 is a preferred embodiment of the second filtering plane employed in this band-pass filter;

FIG. 9 depicts a hexagonal array of differential amplifiers forming a preferred embodiment of the summing plane employed in this band-pass filter;

FIG. 10 shows electrically aligned elements taken from the sensor plane and the three planes of the band-pass filter, to show the interconnection of these four planes;

FIG. 11 is a graphical presentation of the four output nodes of the band-pass filter connected in a diamond pattern to explain the concept of line element peak detection;

FIG. 12 is a preferred embodiment of a comparator circuit employed in the line element peak detector of this invention;

FIG. 13 is a partial view of the preferred construction of this peak detector in which several comparator circuits of FIG. 12 are presented in block form;

FIG. 14 is an alternative preferred embodiment of the construction of the comparator circuit; and FIG. 15 is a preferred embodiment of a partial view of a threshold circuit employed in the line element peak detector.

DESCRIPTION OF THE PREFERRED EMBODIMENT

It is known from studies performed on the visual systems of animals and man that some preprocessing is performed at an early stage at the retina. Its purpose is to extract quickly some of the important features of patterns seen by the system. This kind of preprocessing, which generally precedes recognition, can be thought of as a parallel and instantaneous operation in the sense that the state of all optical inputs are simultaneously considered to extract particular features from the pattern. Preprocessing, analogous to that performed by the human eye, is attained by the present invention.

In the viewing of a scene, it is normally found to be composed of a texture, a pattern, and noise. The term pattern includes, by example, images and characters, or any other signal which is to be identified or recognized. The texture is the background information in which the pattern resides. Assuming for ease of description that the texture is redundant information, it can be treated as noise together with any other features in the scene which might degrade the pattern or interfere with its detection and must be removed. It should be understood, however, that when appropriate, the texture composition or variations in the texture can be the signal which is defined, and the teachings of the present invention can be employed to preprocess such signal. For the present purposes, however, the shape of the pattern shall be the signals which are defined, and pictorial noise removal and signal enhancement shall be accomplished on that premise.

The preprocessing of such scenes in the present invention is accomplished by use of the principles of communication theory in the spatial domain. The texture forms the carrier which is spatially modulated by the pattern, and this modulated signal is transmitted via a communication channel such as reflected electromagnetic radiation. In the receiver, sensors are employed which receive the electromagnetic radiation and convert the spatially-modulated scene into electrical signals. Demodulation is by way of a spatial bandpass filter which enhances the input visual pattern from the texture carrier, and a detector locates the edges and/or skeleton signals of the pattern and maximizes the signal-to-noise ratio.

This spatial receiver filters and extracts the edge or skeleton of the pattern instantaneously from the spatially-modulated scene, much in the manner of the human visual system, to provide an enhanced signal for use by a pattern recognition system.

Prior to describing the preferred embodiment of this invention, it may be helpful to undertake a brief analysis of a simple one-dimensional prescribed region which can be assigned a geometric center estimate representing a one-dimensional skeleton. This analysis is performed in the spatial and spatial frequency (Fourier transform) domains of the function which includes the region of interest.

An example of a one-dimensional function is shown in line ($a$) of FIG. 1. It consists of a central region defined by the interval $x_2 \leq x_1 \leq x_3$, and whose texture has a uniform statistical appearance different from that of the surrounding texture. The geometric center of the region is estimated as $x_1$, where: $x_1 = x_2 + x_3/2$. This estimate of $x_1$ can be made more accurately if the region to be skeletonized is reduced to an average grey level representation which is different than that of its surroundings. This first requires the provision of a texture filtering capability. The filter is defined so as to enhance the spatial frequencies of the region to be skeletonized and attenuate those of the surrounding textures. The spatial power spectrum representation of the function shown in line (a) of FIG. 1 is shown in line (b). As can be seen, the textures have distinct power spectra whose envelopes differ from each other. Here, the energy is primarily concentrated in distinct bands around the frequencies $f_1$ and $f_2$.

By selecting a band-pass filter such as shown in line (c), it is possible to remove the energy of the undesired texture, leaving only the energy of the desired region. Then, by full wave rectification of the filtered region followed by a low pass filter, an average region is obtained whose texture has been filtered out [see line (d)]. By passing the region shown in line (d) through the band-pass filter shown in line (e) we obtain the region shown in line (f). Peak detecting results in identification of a point at $x_1$ which represents the one-dimensional skeleton of the region. Alternatively, for edge detection of the average region of line (d) a different band-pass as shown in line (g) can be used. This filter is centered at a higher spatial frequency than the one shown in line (e). The resulting filtered region is depicted in line (h). Peak detecting results in identification of edge points at $x_2$ and $x_3$.

While the foregoing analysis concerns a simple one-dimensional function formed of two sine waves, the techniques employed can be used in pattern filtering and skeleton or edge extraction in two or higher dimension, spatially-modulated signals. Furthermore, by adoption of a basic premise concerning such signals, preliminary steps such as rectification and low-pass filtering described in the above example can be eliminated from the processing. This basic premise is that a spatially-modulated visual scene cannot contain any negative levels. The patterns, textures, and noise in the scene must range from zero through positive levels only.

With reference now to FIG. 2, a stationary scene 10 is shown in two dimensions composed of a pattern in the configuration of a letter "C" against a background texture 12. The scene is illuminated by a light source 14.

In accordance with the invention, there is provided photoelectric means for converting the light energy received from the scene into electrical signals proportional to the intensity of the received light. As embodied herein, the photoelectric means includes a plurality of photoelectric converters, designated generally by numeral 16, upon which the light is focused by lens system 18 after reflection off of scene 10. Preferably, the photoelectric converters 16 are light sensors, including but not limited to phototransistors or photo-SRC's.

The photoelectric converters 16 function as an electronic retina to provide a plurality of outputs in parallel, and are preferably arranged in a hexagonal array as shown in FIG. 3. The individual converters or sensors 20 are all stimulated simultaneously by the light reflected by scene 10, and each acts as a current source whose current is proportional to the intensity of light impinging upon it. As an example, the output current for each sensor can vary between 0 ma for black or absence of light and 10 ma for white light or maximum intensity. It has been found that an array of 169 light sensors 20 results in an electronic retina having the necessary resolution for obtaining satisfactory preprocessing of the pattern in conjunction with the remainder of the system next to be described.

With reference now to FIG. 4 there is presented in a generalized block diagram form the preferred embodiment of the present invention as it applies to the detection of a skeleton signal. The input to the system is via the sensors 16 described above. If desired, the scene picked up by the sensors can be presented on an input data display 22.

In accordance with the invention, there is provided a spatial filter for deriving signals representative of an enhanced pattern with respect to the carrier in the spatially-modulated scene, and having a plurality of signal inputs each connected to at least one of the photoelectric means outputs. As embodied herein, the spatial filter is a spatial band-pass filter 24 whose inputs are connected to the outputs of the sensors 16. The purpose of this filter 24 is to demodulate the spatially modulated signal applied by the input sensors 16. By so doing, the input visual pattern is selectively enhanced with respect to the texture carrier and thus becomes a filtered version of the input scene. The band-pass filter 24 also tends to smooth a degraded pattern and thereby enhances the pattern signal with regard to such noise. The output of band-pass filter 24 is provided as a plurality of parallel outputs.

A representation of how the filtered version of the input letter C might appear if it were possible to see the potentials at the outputs of filter 24 is shown in a perspective view in FIG. 5. Portrayed is a spatial potential distribution of the input pattern which has been derived instantaneously upon stimulation of the sensors 16 by the scene of FIG. 2. The letter C is clearly enhanced with respect to its background texture which forms lower and sometimes negative voltage levels in the region outside of the generally smoothed C-shaped configuration. Any blemishes or similar image degradations have also been filtered out by the selective band-pass characteristic of the filter.

In accordance with the invention, means are provided for peak detecting the outputs of the spatial filter by selectively comparing the signals at each of a plurality of pairs of outputs with the signals at at least one other pair of outputs adjacent to each such pair, to form an output pattern which is an enhanced version of the input. As embodied herein, a line element peak detector 26 is connected to receive all olutputs of filter 24 simultaneously in parallel and compare each pair of adjacent outputs with the signals at the outputs adjacent thereto. A peak line element is identified wherever one pair of spatial filter outputs has signals at both outputs greater than that of all outputs with which it is being compared. Thus, from the pattern developed by band-pass filter 24 a series of peaks is detected whose locus defines line elements forming the output pattern. In the view of FIG. 6, the output pattern of the letter C is represented as a skeleton locus 28, which lies at approximately the geometric center of the input pattern. The skeleton is preferably formed of a plurality of peak potential points 32 through which line elements can be drawn as shown to interconnect the peaks.

The output of peak detector 26 is provided in parallel for further pattern processing, if desired, or can be applied to a conventional optical pattern recognition system. As in the case of filter 24, the output of peak detector 26 appears instantaneously upon the presentation of the scene 10 at the input of sensors 16. If preferred, an output buffer 36 can be interposed between the output of peak detector 26 and the next stage. Preferably, an output display 38 is connected to buffer 36 to provide a display of the enhanced image of the type shown in FIG. 6. This can be readily accomplished by the use of light emitting diodes (LED), which are actuated in response to the peak potentials supplied by peak detector 26.

Spatial Band-Pass Filter 24

With reference now to FIGS. 7 through 10, there is shown the preferred embodiment of the spatial (band-pass) filter 24. As embodied herein, this filter is constructed in three planes, the first two of which are low-pass spatial filters and the third being a summing plane for the first two planes. Each plane is preferably connected in a hexagonal pattern, thus following the plan of sensors 20 in the photoelectric means.

In FIG. 7, there is shown the preferred embodiment of the first plane 40 of filter 24. As embodied herein, plane 40 is composed of resistive elements electrically interconnected in a hexagonal pattern. Preferably, the resistive elements are resistors 42 connected in a large hexagonal pattern composed of a plurality of smaller hexagons, the center of each being the common connection point of six resistors 42 radially disposed outwardly therefrom. If preferred, the periphery of the large hexagon can be terminated in other convenient shapes such as a square or circle, particularly where the centers of the scenes being processed contain the patterns to be enhanced.

These common connection points are called nodes. As shown in the exemplary arrangement of FIG. 7, there are seven nodes 44 in plane 40, and these nodes 44 form the inputs of this band-pass filter. To this end, each node 44 is preferably connected to the output of a single sensor 20 of the photoelectric means and is electrically aligned therewith. For example, assuming that there were only seven sensors in FIG. 3 arranged in the hexagon identified by the numeral 34, the center sensor would connect to the center node 44 and the six sensors surrounding this center sensor would connect to the six corresponding nodes 44 surrounding this center node. Thus, the resistive plane 40 repeats the pattern of the photoelectric means 16 both as to its configuration and in the fact that each node 44 is the counterpart of a sensor 20 positioned in the same relative point in the plane of the photoelectric means. In the example of an array of 169 sensors mentioned earlier, the number of nodes is also 169 to obtain satisfactory preprocessing of the pattern.

As an example of the sensor/node connection, two phototransistors 20a and 20b are shown in FIG. 7 connected to two nodes 44. The light intensity received by each phototransistor individually determines the current flow into its respective node 44. A node resistor 46 is connected between each node 44 and ground. At the periphery of plane 40, a plane load resistor 48 is connected between ground and each of the junction points of the resistors 42 forming the periphery of the large hexagon. The sensor current which flows into each node enters a resistance load determined by all of the resistors of the plane 40. The additivity properties of the resistive plane in response to all input sensor currents cause a voltage to occur at each node proportional to all of the currents flowing into such node. This voltage forms the output voltage for each such node.

To aid in an understanding of the operation of resistive plane 40, assume that a single sensor 20 in the array of FIG. 3 is excited by the receipt of light, and a single current enters the node 44 to which this sensor is connected. A potential drop can then be measured both at this node 44 and at every other node 44 in the plane. The magnitude of each voltage is dependent upon the intensity of the input current and the inverse of the distance between each of the other nodes 44 and the excited node. The voltage gradient or the rate at which the potential decays moving outwardly from the excited node is controlled by the value of the resistor 42, the node resistors 46, and the plane load resistors 48. Although the words "rate" and "decay" are used, this is not with reference to time but with reference only to distance because from a timing standpoint, the voltages at each node 44 are attained substantially instantaneously with the receipt of light by the sensors 20. Thus, what is meant by a voltage decay rate is based strictly upon the distance or space separating a given node 44 from the one which is excited. The voltage is a maximum at the excited node and a decreasing or decaying potential value at each node progressively outward therefrom. The potential distribution over the plane 40, caused by current entering a single node 44, is defined as the impulse spatial response or point spread function of the plane.

If a scene such as scene 10 of FIG. 2 is now viewed, each of the sensors 20 is stimulated by the received light depending on its position in the sensing matrix, and causes a proportional current to flow into its respective node 44. The current entering each node 44 causes a potential to appear at each such node as well as at each of the other nodes in the plane 40. Thus, the potential at each node becomes a combination of its own potential and the potentials developed at all of the other nodes in the plane as such other potentials are modified by the rate of potential decay between each of the other nodes and the input node of interest.

The stationary scene 10 is presented to plane 40 as a spatial, grey-level, distribution function because of the action of the sensors 20 that respond in proportion to the amount of received light. The plane 40 provides a spatial potential distribution of this input scene determined by the selected resistance values in the plane. The action of this plane is that of a two-dimensional, spatial low-pass filter whose bandwidth discriminates against the higher spatial frequencies including the background texture but passes most of the energy of the pattern and other low frequency components, including D.C.

The preferred embodiment of the second plane 50 is shown in FIG. 8. As embodied herein, plane 50 is made of resistive elements electrically interconnected as hexagons in the same manner as plane 40. Again, these elements are preferably resistors 52 connected in a large hexagonal pattern. The smaller hexagons have seven nodes 54 each, with a node resistor 56 connected between each node and ground. Peripheral load resistors 58 for resistive plane 50 are connected between ground and each common junction point of the resistors 52 forming the periphery of the large hexagon. The nodes 54 form the inputs to plane 50.

The hexagonal array of plane 50 preferably repeats the pattern of plane 40. Each node 54 is thus electrically aligned with the similarly positioned node 44 of resistive plane 40, and is connected thereto by a large coupling resistor 60. Two such interconnections employing resistors 60 are shown in FIG. 8 for purposes of illustration.

The corresponding nodes in the two planes 40 and 50 are excited by equivalent current sources. The currents flowing into the nodes of plane 50, however, are of a lower value in view of the attenuation caused by each of the resistors 60. Viewed in another way, the total voltage created at each node 44 of plane 40, based on the current applied directly by a sensor 20 and from the other nodes 46, is applied across the series combination of resistor 60 and the characteristic resistance appearing at the corresponding node 54 in plane 50. The voltage division which occurs creates a smaller initial voltage at a node 54 than the voltage at its corresponding node 44 in plane 40.

As was the case in plane 40, the total voltage appearing across the node resistor 56 at any given node 54 is caused by the direct application of current from its corresponding node in plane 40 and the currents flowing from the other nodes 54 in plane 50. Plane 50 is preferably designed to have a lower radial attenuation constant than plane 40, i.e., there is a lower rate of potential decay with distance outwardly from each node 54. Plane 50 thus responds as a two-dimensional, spatial, low-pass filter although its cutoff spatial frequency or bandwidth is less than that of plane 40. The large coupling resistors 60 tend to isolate the plane 40 from the loading effect of plane 50. These resistors also cause the spatial potential distribution of plane 50 to be lower in value than plane 40.

The spatial impulse response of either of the planes 40 or 50 preferably does not vary with the location of the excited node in that plane. In this manner, spatially-invariant low-pass spatial filters are obtained. One example of how a resistive plane can be constructed to respond in this way is to make the characteristic impedance measured at each node the same throughout the plane.

A preferred embodiment of a summing plane 80 is shown in FIG. 9, and comprises means for obtaining the difference between the signals appearing at the nodes of low-pass filter 40 and the nodes of low-pass filter 50. As here embodied, plane 80 is also preferably arranged as a hexagonal array of differential amplifiers 82, equal in number to the sensors 20 and the nodes 44 and 55 in planes 40 and 50, respectively. Each differential amplifier 82 is electrically aligned with the similarly positioned nodes and sensor in the earlier planes.

Each amplifier 82 has two input lines 84 and 86 coupled into its positive and negative terminals, respectively. Line 84 is connected to its corresponding node 44 in plane 40, and line 86 is connected to the corresponding node 54 of plane 50. The output of each amplifier is provided at node 88. For an aid in understanding the interconnections of the planes, attention is also invited to FIG. 10 showing a series of aligned elements taken through four planes, from the input sensor to the differential amplifier.

The sensor 20 is here shown as a phototransistor 20a whose output is connected into node 44a in resistive plane 40. Node 44a is connected by coupling resistor 60a to the node 54a of resistive plane 50. The output of node 44a is also applied by line 84a to the positive input of differential amplifier 82a. The output of node 54a is applied by line 86a to the negative input of this amplifier. This amplifier sums the voltages at its two inputs, and the output signal appearing at its output node 88a is thus the difference in voltage between the voltages developed at nodes 44a and 54a.

The resultant spatial potential distribution provided at the output nodes 88 of the spatial band-pass filter is the filtered response of the two filtering planes 40 and 50 to the excitation of the sensors 20 by a visual scene. Although the potentials on each plane 40 and 50 are all positive (or all negative as the case may be) the net resultant potential distribution can assume positive as well as negative values because of the subtraction operation in the summing plane 80. The filtering characteristics of spatial filter 24 is that of a band-pass filter by virtue of the subtraction of the low-pass filter of plane 50 from the low-pass filter of plane 40. This subtraction sets the low frequency cutoff point while the high frequency cutoff is determined by the characteristics of plane 40. It is preferred to amplify the output of plane 50 prior to subtraction in view of this plane's lower potential values caused by the coupling resistors 60.

The output appearing at nodes 88 is thus a spatial potential distribution representative of the band-pass filtered version of the input scene 10 detected by sensors 20. This filtered output scene is shown in FIG. 5 as a smoothed surface having both positive and negative values. The letter C pattern is seen as a continuous spatial peak which has been enhanced with respect to the background texture.

As mentioned above, the output of the band-pass spatial filter 24 appears simultaneously with the presentation of the scene to the sensors 20. As has been learned from the foregoing description of the construction of this filter, there is no delay interposed in any plane, and all processing is performed through each of the three planes 40, 50 and 80 in a parallel manner without the need to resort to iteration or the imposition of time delays. Thus, the filtered or smoothed output pattern such as shown in FIG. 5 is derived and presented to peak detector 26, subject only to the normal delay of the propagation of the electrons through the resistances.

The spatial cutoff frequencies of the spatial band-pass filter 24 can be controlled by proper selection of the resistors forming the low-pass filter planes 40 and 50. By varying the values of the resistors in either plane, the spatial potential distribution in that plane is varied and its filter bandwidth is thereby varied. Once the desired spatial potential distribution is achieved for both planes, one is subtracted from the other, as explained above, to obtain the desired transmission band for the spatial band-pass filter 24. As a convenience, the plane resistors can be made variable or other means employed to change their ohmic value so that the transmission band of this band-pass filter can be readily varied. Also, more than two resistive planes can be provided and combined to obtain more complex band-pass characteristics.

Having some general knowledge of the power spectra of the patterns and textures forming the input scenes is an aid in designing the response of the band-pass filter 24. For example, if edge-detection of letters or numbers configured as shown in FIG. 2 is desired, intuitively it is known that the abrupt transitions at the pattern edges contain high spatial frequencies. The transmission band of the filter 24 must, therefore, have its cutoff frequencies higher than is used in skeleton detection. The resistors in the planes 40 and 50 are varied or selected to change properly the spatial distribution potential of each plane and thereby the spatial frequency response of these planes. Additionally, the relative gain of the planes can be changed in the differential amplifiers 82 prior to substraction. The result is an increase in the upper cutoff frequency of both filters so that the transmission band of band-pass filter 24 is moved higher in frequency.

This upper frequency cutoff is chosen to pass a significant amount of energy at the edges of the pattern yet still discriminate against the higher frequencies of the texture. Similarly, the low frequency cutoff is raised sufficiently to attenuate the geometric center of the filtered pattern well below that of the level of the pattern's edges.

The resultant filtered scene has a pattern having peaks at its edges and a valley in between the peaks. The remainder of the scene is the filtered texture whose levels lie well below the level of the peaks, much the same as the background texture shown in FIG. 5. The peaks are then peak detected by line element peak detector 26 to provide an enhanced output signal in a configuration which follows the boundaries or edges of the input pattern.

Peak Detector 26

As stated previously, the output of the band-pass spatial filter 24 is applied to peak detector 26, and in the example used a skeletonized output is obtained. In the prior art, skeletons were considered as a set of points, each of which had to satisfy a certain relationship with six or eight immediate neighboring points. In the concept of the present invention, and as shown in FIG. 6, a skeleton is represented by line elements which describe the maximum (or minimum) of a filtered or smoothed two dimensional function.

A line element can be geometrically defined as the intersection locus of two planes. A plane can be described by three points. Two intersecting planes having two points in common can be described by at least four points. Thus, these four points are sufficient to describe a maximum (or minimum) line element of a two dimensional pattern.

With reference to FIG. 11, there is shown a graphical presentation of four output nodes $88a$, $88b$, $88d$ of the summing plane 80 in spatial filter 24 connected in a diamond. A heavy line segment is drawn between nodes $88a$ and $88b$, representing the intersections of planes $88a, b, c$ and $88a, b, d$. Assuming again for ease of description, that maximum values are to be detected, line segment $\overline{ab}$ is a maximum and a skeleton line element of a filtered two dimensional image if it meets the text of:

max $(c,d)$ < min $(a,b)$.

This definition preferably requires that the two dimensional image to be skeletonized be hexagonally sampled to permit the use of identical peak detector operators over the entire scene, with a resultant fewer logical operations per skeleton line element. However, this preference does not preclude the use of other sampling arrays, e.g., rectangular, although, depending on the orientation of the line segment, a larger number of nodes must be used to define the line segment and more logical operations used to detect it.

With reference again to FIG. 9, the output nodes 88 of the spatial band-pass filter are shown arranged in a planar, hexagonal fashion, each node providing an output signal thereon. With particular attention to the diamond formed by nodes $88a, b, c, d$, the line segment represented by an imaginary line $\overline{ab}$ drawn between nodes $88a$ and $88b$ qualifies as a line element if the minimum voltage of $Va$, $Vb$ exceeds the maximum voltage of $Vc$, $Vd$.

The line element peak detector 26 as embodied herein includes a plurality of comparator circuits connected to the nodes 88 of filter 24. As an example of this circuit, FIG. 12 shows a comparator circuit 96 which is designed to have its two pair of inputs connected to two node pairs to see if one of the pairs is a peak and thus qualifies as a line element.

Each comparator 96 preferably includes a differential amplifier 98 having positive and negative inputs. A minimum signal detecting circuit is connected between the positive input and one pair of comparator circuit inputs To this end, a negative source is connected to the positive input through a resistor 99. A positive source is also connected to the positive input via resistor 100 and forward-biased diode 102. Inputs $88a$ and $88b$ are connected to the cathodes of diodes 104 and 106, respectively, and the anodes of these diodes are commonly coupled to the junction 108 of resistor 100 and diode 102.

At the negative input of differential amplifier 98, a maximum signal detecting circuit is connected to apply the greater of the two signals received at the other pair of inputs of comparator 96. As shown, a positive source is connected to amplifier 98 by resistor 110. A negative source is also coupled to this input through resistor 112 and diode 114. Inputs $88c$ and $88d$ are connected to the anodes of diodes 116 and 118, respectively, and the cathodes of these diodes are commonly connected to the junction 120 of resistor 112 and diode 114.

In the operation of circuit 96, amplifier 98 gives a positive output indicative of line segment $\overline{ab}$ qualifying as a line element if the input voltages at nodes $88a$ and $88b$ are both higher than the voltages at either nodes $88c$ or $88d$. For example, assuming that nodes $88a$ and $88b$ are both ten volts, diodes 104 and 106 are forward biased, and junction 108 is at 10 volts also (ignoring the voltage drops across the diodes for ease of description). Diode 102 is also forward biased and the ten volt level at junction 108 is applied to the positive input of differential amplifier 98. Assume, also, that the voltages at nodes $88c$ and $88d$ are both two volts, then diodes 116 and 118 are forward biased and apply this two volt level to junction 120. Diode 114 is also forward biased by virtue of the positive fifteen-volt source at its anode, and the current flow from this source to junction 120 causes a thirteen-volt drop across resistor 110 leaving the anode of diode 114 at a positive two volts. This voltage level is applied to the negative input of differential amplifier 98.

The voltages at nodes $88a$ and $88b$ are both higher than the voltages at either node $88c$ or $88d$ in this example, resulting in the positive input of differential amplifier 98 being more positive than its negative input. A positive output level is provided at the output node 122 of comparator circuit 96. A line element has been detected by the peak detector 26.

If the voltage level at either of nodes $88a$ or $88b$ is lowered, then junction 108 and the positive input of amplifier 98 follow this drop. Conversely, if either of nodes $88c$ or $88d$ increases in voltage level, junction 120 and the negative input of amplifier 98 follows this increase. For example, assume that nodes $88b$ drops to four volts. Junction 108 is pulled down to that level.

Diode 104 becomes back-biased and, therefore, node 88a has no influence on the circuit even though its voltage is at the higher ten-volt potential. The four volts at junction 108 is now applied to the positve input of amplifier 98.

Assume also that node 88d is now at six volts while node 88c is unchanged. Diode 118, being forward-biased, permits junction 120 to rise to this new voltage level. Diode 116 is now back-biased and the voltage at node 88c has no further influence on the circuit. Diode 114 is still forward-biased and current flow is still from the positive source through resistor 110 and diode 114. The drop across resistor 110 is now such that the anode of diode 114 is at 6 volts and this level is applied to the negative input of differential amplifier 98. The positive input of this amplifier has a voltage below that of the negative input, and a ground potential output appears at node 122. This indicates that the imaginary line segment between nodes 88a and 88b is not a line element.

The circuit within block 96 shown in FIG. 12 for determining whether or not an imaginary line segment between two adjacent nodes qualifies as a line element is provided for each pair of node neighbors 88 shown in FIG. 11. In this manner, the voltages at every node pair in the spatial band-pass filter output is examined to see whether or not they are both higher than the voltages of the other two nodes in the associated diamond pattern, and thereby whether they qualify as one of the line elements in the enhanced output pattern.

As a further aid in understanding this concept, FIG. 13 shows three blocks 96a, 96b, and 96c of peak detector 26, each block being constructed in accordance with the circuit of FIG. 12 and differing only in the input connections. Comparator circuit 96a has been previously described with regard to FIG. 12 and has as its inputs the nodes 88a, b, c, d. As previously described, this determines whether or not the imaginary line segment between nodes 88a and 88b is a peak so as to qualify as a line element of an output pattern. In comparator circuit 96b, nodes 88b and 88d are compared to see if they both exceed the voltage level of either nodes 88a and 88g so that the imaginary line segment connecting nodes 88b and 88d can qualify as a line element. In the same manner within comparator circuit 96c, the imaginary line segment connecting nodes 88a and 88d is examined to see if this line is a peak as compared to the input voltages provided by nodes 88b or 88f.

The outputs of these three comparator circuits are provided at output nodes 122a, 122b, and 122c, respectively. To aid in envisioning this concept of detecting line peaks, the three imaginary line segments which are being examined have been superimposed as phantom lines at the three output nodes which represent the three pairs of nodes 88 connected by these lines. Again using the presence of a positive signal to indicate a peak, a positive voltage appearing at node 122a identifies the imaginary line connecting nodes *a* and *b* as a line element in the output image. A positive output at node 122b identifies the line connecting nodes *b* and *d* as a line element. In the same manner, a positive output at node 122c identifies the line connecting nodes *a* and *d* as a line element.

The output of peak detector 26, with regard to the embodiment of FIGS. 11 – 13, is thus a plane of discrete positive and ground potential points or nodes in which the positve potential nodes define the geometric center or skeleton of the input pattern in a background texture of ground potential. Each positive potential represents the detection of a peak line element in the output of band-pass filter 24. Display 38 can present this enhanced scene, if desired, by use of LED's (not shown) connected to the nodes 122 via buffer 36.

In keeping with the electrical alignment followed by the plane of sensors 16 and the planes of spatial filter 24, the output nodes 122 of peak detector 26 are positioned relative to one another based upon the relative position in the plane 80 of the pair of input nodes 88 represented by each respective node 122. An example of this positioning is shown in FIG. 13. By having an output node 122 for each pair of input nodes 88, there will be a larger number of output nodes than input nodes. Accordingly, it may prove desirable to selectively reduce the number of output nodes 122 to the approximate number of input nodes 88, and thereby reduce the number of circuits 96 required.

Because of the parallel processing utilized at the sensors 16 and in spatial filter 24, it should be clear that the processing in peak detector 26 is also performed on a parallel basis by the comparator circuits 96. The outputs of peak detector 26 appear at output nodes 122 substantially instantaneously with the presentation of the scene to sensors 16, the only delay being the normal delay in an electrical circuit caused by the propagation time of the electrons.

An alternative embodiment of the comparator circuit for use in peak detector 26 is shown in FIG. 14. As embodied herein, the four nodes forming the diamond pattern are selectively connected in the four possible pair combinations into the two inputs of four differential amplifiers. Again assuming that the imaginary line segment between nodes 88a and 88b is being examined to see if it is a peak line, the voltages at nodes 88a and 88b must be both higher than the voltages at either of nodes 88c or 88d.

Node 88a is therefore connected into the positive input of differential amplifiers 124 and 126, and node 88b is connected into the positive input of differential amplifiers 128 and 130. Node 88c is connected into the negative inputs of amplifier 124 and 128, and node 88d is connected into the negative inputs of amplifiers 126 and 130. The output of the four amplifiers are all connected into a coincidence circuit, here shown as an AND gate 132. If the voltage at node 88a is higher than the voltage at either nodes 88c or 88d, then amplifiers 124 and 126 will provide a logical One to two of the inputs of AND gate 132. Similarly, if the voltage at 88b is higher than that at nodes 88c and 88d, both of the differetial amplifiers 128 and 130 will provide a logical One output which is applied to AND gate 132. In the case just described, AND gate 132 has four coincident like logical inputs and its output node 134 becomes a logical One, indicating a peak line element.

Should either of nodes 88a or 88b have a voltage level below that of either nodes 88c or 88d, then the related differential amplifier or amplifiers will provide a Zero output to one or more of the inputs of AND gate 132. The output node 134 of the peak detector would then be a Zero indicating that the imaginary line segment between nodes 88a and 88b was not a peak. For example, assume that the voltage at node 88b is below that of node 88c. The negative input of differential amplifier 128 now has a voltage level above that of the positive input and its output is a logical Zero. The application of this logical Zero into AND gate 132 prevents coincidence from occurring, and its output cannot become a logical One.

As in the case of comparator circuit 96, a comparator circuit as shown in FIG. 14 can be provided for each pair of node neighbors 88 shown in FIG. 11. The output of peak detector 26 is thus a plane of discrete logical Ones and Zeros, represented by appropriate potentials, in which the logical Ones are in a configuration which define the geometric center or skeleton of the input pattern.

While the filter 24 and peak detector 26 discriminate against noise and background texture, it is possible that extraneous or scattered peak signals, other than the large peak signals representative of the enhanced pattern, can occur at the output of the peak detector. Because the detection of each peak is an isolated operation in that it is performed with respect to four defined nodes, positive identification of peak line elements might be obtained at nodes other than those in the pattern skeleton if the comparator test is met.

To minimize the occurrence of such false peak indications, and thereby enhance the output signal to noise ratio, a threshold circuit can be employed in the present invention. As embodied herein, and with reference to FIG. 15, the output nodes 88 of filter 24 are compared with a preset threshold signal source 136. Preferably, this source applies a low positive voltage to the negative input of a plurality of differential amplifiers, equal in number to the number of output nodes 88. The nodes 88 are individually connected to the positive terminal of a respective one of the differential amplifiers. In the partial view of the threshold circuit shown in FIG. 15, the four nodes 88a, b, c, d used previously are again shown applied to the positive input of amplifiers 138a, 138b, 138c and 138d, respectively.

The outputs of the differential amplifiers 138 are selectively grouped together in combinations of four in accordance with the four node neighbors forming the corners of each diamond pattern. In FIG. 15, the four differential amplifiers 138a, b, c, d have their outputs grouped together at the input of an AND gate 140. The output of AND gate 140 is connected to one input of AND gate 142. The other input to this AND gate is received from the output node 122 of comparator circuit 96 (FIG. 12). The output of AND gate 142 is applied to a node 144 which now forms the output node of the peak detector 26.

In operation, all four nodes 88a, b, c, d being compared in the comparator 96 must be above the threshold voltage applied at terminal 136 to permit the acceptance of $\overline{ab}$ as a peak line element in the output pattern even though $\overline{ab}$ survives the test in the comparator 96. This is because if any input node 88a, b, c, d is below the level applied at 136, the output of its associate differential amplifier 138 will be a ground, and prevents coincidence from occurring at AND gate 140. In this case, there can be no coincidence at AND gate 142, regardless of the level of the signal applied at node 122. The output node 144 in peak detector 26, remains at a level, e.g., ground potential, indicative of a non-peak. Thus, the line element peak detector 26 is prevented from identifying a peak line element under such conditions.

Similarly, if all four nodes 88 in the diamond under consideration are above the level of threshold 136, a positive voltage will be applied by the four differential amplifiers 138 causing coincidence at gate 140. A positive or One signal is applied to AND gate 142. The output node 144 either stays at ground potential or rises to a positive level, indicative of a peak line element, depending upon the signal applied to node 122 by the comparator circuit.

Although the threshold circuit of FIG. 15 has been described with reference to the comparator circuit 96 of FIG. 12, it should be apparent that this threshold circuit can also be used with each of the comparator circuits shown in FIG. 14. In such case, the second input to AND gate 142 comes from node 134 of FIG. 14 rather than node 122. Alternatively, AND gate 142 can be eliminated and the output of AND gate 140 applied as a fifth input to AND gate 132, requiring coincidence of five logical One inputs to AND gate 132 for positive identification of a peak line element at output node 134.

Although peak detection has been described with regard to detecting positive peaks, it should be recalled that this description related to the analysis of a scene having a light pattern on a dark background texture. If instead the scene contains dark patterns on a light background texture, the same process can be used provided the output of the sensors 20 are inverted before they are spatially filtered. Alternatively, the peak detector can be readily designed to detect negative peaks rather than positive peaks.

It will now be apparent to those skilled in the art that various modifications and variations can be made in the pattern enhancement system of the invention without departing from the scope or spirit of the invention.

What is claimed is:

1. A method of preprocessing an optical pattern in a spatially-modulated scene to provide an enhanced pattern for use with an optical pattern recognition system and the like, comprising:
    a. converting the light energy received from said scene into electrical signals proportional to the energy of the received light, and providing said signals at a plurality of first outputs in parallel;
    b.
        1. simultaneously receiving at a plurality of hexagonally disposed input nodes the signals provided at said parallel first outputs,
        2. band-pass filtering said signals in the spatial domain for deriving further signals representative of an enhanced optical pattern with respect to the carrier in the spatially-modulated scene, and
        3. providing said further signals at a plurality of hexagonally-disposed output nodes in parallel;
    c. simultaneously peak detecting the further signals provided at said second output nodes by
        1. selectively comparing the further signals at each of a plurality of pairs of adjacent output nodes with two signals at another pair of adjacent output nodes, each two pairs of output nodes in the hexagonal output pattern whose signals are compared being those for which imaginary lines connecting the two nodes in each pair are substantially perpendicular, and
        2. providing a series of peak output signals whose locus defines line elements representative of an output pattern enhanced with respect to said input and derived immediately upon the receipt of light energy from said scene.

2. A method as claimed in claim 1, wherein said band-pass filtering step includes:

a. deriving in a first plane a spatial potential distribution of the signals received at said input nodes effective for low-pass filtering of the spatially-modulated scene in the spatial domain;

b. simultaneously deriving in at least another plane a spatial potential distribution of the signals provided at the parallel outputs of a preceding plane effective for low-pass filtering of the spatially-modulated scene in the spatial domain at a band-pass different from that of a preceding plane;

c. deriving in a third plane a resultant spatial potential distribution from said first and at least another plane representative of the band-pass filtered scene.

3. A method as claimed in claim 2 wherein said step of deriving a spatial potential distribution in a first plane includes:

a. receiving said electrical signals simultaneously at a plurality of interconnected input nodes in said first plane and summing the currents at each node to cause a voltage to occur at each node proportional to the currents flowing into each node.

4. A method as claimed in claim 3 wherein said step of deriving a spatial potential distribution in at least another plane includes:

a. applying the voltage which occurs at each node of the first plane simultaneously to a corresponding one of a plurality of interconnected nodes in a second plane and summing the currents at each node to cause a voltage to occur at each node proportional to the currents flowing into each node.

5. A method as claimed in claim 4 wherein said step of peak detecting includes;

a. providing a peak output signal wherever signals at any such pair of second outputs are both greater than the signals at the adjacent pair of second outputs.

6. A method as claimed in claim 5 further comprising the step of:

a. preventing a peak output signal from occurring for each two output pairs being compared whenever any of the output signals at such two pairs is less than a predetermined signal level.

7. A spatially-invariant band-pass filter for deriving signals representative of an enhanced pattern with respect to the carrier in a spatially-modulated scene, and comprising:

a. a first low-pass spatial filter having a plurality of interconnected nodes forming a first plane and a plurality of load impedances connected at its periphery, and having a first filter bandwidth;

b. a second low-pass spatial filter having a plurality of interconnected nodes forming a second plane and a plurality of load impedances connected at its periphery, said plurality of nodes being connected to the plurality of nodes of said first low-pass spatial filter and having a second filter bandwidth; and c. means for obtaining the difference between the signals appearing at the outputs of the first low-pass spatial filter and the outputs of the second low-pass spatial filter.

8. A spatially-invariant band-pass filter as claimed in claim 7 further comprising:

a. a plurality of parallel inputs, each input connected to one node in said first low-pass spatial filter;

b. each node in the first plane being connected to a corresponding node in the second plane;

c. said difference obtaining means is conneted to the nodes of said first and second planes to form a summing plane whose output forms the output of the spatially-invariant band-pass filter.

9. A spatially-invariant band-pass filter as claimed in claim 8 further comprising:

a. a plurality of resistive elements interconnecting the nodes in the first plane to form a first resistive plane;

b. a plurality of resistive elements interconnecting the nodes in a second plane to form a second resistive plane.

10. A spatially-invariant band-pass filter as claimed in claim 9 wherein:

a. said plurality of resistive elements in the first resistive plane comprise:
a plurality of resistors connected in a hexagonal pattern, one resistor interconnecting each node in the plane with each adjacent node; and b. said plurality of resistive elements in the second resistive plane comprise:
1. a plurality of resistors connected in a hexagonal pattern, one resistor interconnecting each node in the plane with each adjacent node.

11. A spatially-invariant band-pass filter as claimed in claim 10 further comprising:

a. a resistor connected between each node and ground in both the first and second resistive planes; and b. a resistor interconnecting each node in the first resistive plane with its corresponding node in the second resistive plane.

12. A spatially-invariant band-pass filter as claimed in claim 11 wherein:

a. said plurality of load impedances for the first resistive plane are resistors, and b. said plurality of load impedances for the second resistive plane are resistors; and wherein said difference obtaining means in said summing plane includes:

a. a plurality of differential amplifiers arranged in a hexagonal array, the input of each of said amplifiers being connected to a corresponding node in the first and second resistive planes.

13. A spatially-invariant band-pass filter as claimed in claim 12 wherein said nodes in said first resistive plane, said nodes in said second resistive plane, and said differential amplifiers are equal in number.

14. A preprocessing system for enhancing a pattern in a spatially-modulated scene comprising:

a. photoelectric means for converting the light energy received from said scene into electrical signals proportional to the intensity of the received light, and providing a plurality of outputs in parallel, b. a spatial band-pass filter for deriving signals representative of an enhanced pattern with respect to the carrier in the spatially-modulated scene, said filter having a plurality of signal input nodes arranged in an hexagonal pattern, each input node connected to at least one of said photoelectric means outputs, and a plurality of parallel output nodes arranged in an hexagonal pattern, c. means for peak detecting the outputs of said spatial filter by selectively comparing two signals at each of a plurality of pairs of adjacent output nodes with two signals at another pair of adjacent output nodes, each two pairs of output nodes in the hexagonal output pattern whose signals are compared being those for which imaginary lines connecting the two nodes in each pair are substantially perpendicular, the output of said peak detecting means providing peaks whose locus define line elements forming an output pattern which is an enhanced version of the input.

15. A system as claimed in claim 14, wherein said peak detecting means comprises:
   a. a line element peak detector connected to the output nodes of said spatial filter, and identifying a peak line element wherever for each of said two pairs of output nodes the two signals at one pair of adjacent output nodes are both greater than the two signals at the other pair of adjacent output nodes.

16. A system as claimed in claim 15, wherein:
   a. said line element peak detector includes a plurality of comparator circuits connected to said nodes, each comparator circuit having its input connected to two of said node pairs to determine if the signals on one pair are both greater than the signals on the other pair, thereby to identify a peak line element.

17. A system as claimed in claim 16 wherein each comparator circuit comprises
   a. two pairs of inputs, each pair of inputs connected to a respective one of said two node pairs,
   b. a differential amplifier having two inputs,
   c. a minimum signal detecting circuit connected between one pair of comparator circuit inputs and one input of said differential amplifier for applying to said one input the lesser of the two input signals of said one node pair,
   d. a maximum signal detecting circuit connected between the other pair of comparator circuit inputs and the other input of said differential amplifier for applying to said other input the greater of the two input signals of said other node pair,
   e. the output of said differential amplifier identifying a peak line element when the signal at said one input of said differential amplifier is greater than the signal at the other input.

18. A system as claimed in claim 17 further comprising:
   a. a threshold signal source,
   b. a threshold circuit provided for each comparator circuit and connected to be responsive to the signals on the two associated node pairs and the threshold signal, for preventing said line element peak detector from identifying a peak line element when said threshold signal source is greater than the signals applied on the four associated nodes.

19. A system as claimed in claim 16, wherein each comparator circuit comprises:
   a. four differential amplifiers, each differential amplifier having two inputs selectively connected to the nodes of said two node pairs,
   b. a coincidence circuit connected to the output of said four differential amplifiers, responsive to provide an indication of a peak line element upon receipt of coincident-like inputs indicative of the signals on the nodes of said one node pair both being greater than the signals on the nodes of said other node pair.

20. A system as claimed in claim 19 further comprising:
   a. a threshold signal source,
   b. a threshold circuit provided for each comparator circuit and connected to be responsive to the signals on the two associated node pairs and the threshold signal, for preventing said line element peak detector from identifying a peak line element when said threshold signal source is greater than the signals applied on the four associated nodes.

21. A system as claimed in claim 14 wherein said spatial filter is a spatially-invariant band-pass filter.

22. A system as claimed in claim 21 wherein said spatially-invariant band-pass filter comprises:
   a. a first low-pass spatial filter having a plurality of interconnected nodes forming the band-pass filter inputs, and having a first filter bandwidth, said interconnected nodes arranged as a first plane having a plurality of load impedances connected at its periphery;
   b. a second low-pass spatial filter having a plurality of interconnected nodes forming the inputs to said second low-pass filter, said plurality of nodes being connected to the plurality of nodes of said first low-pass spatial filter, and having a second filter bandwidth, said interconnected nodes arranged as a second plane having a plurality of load impedances connected at its periphery; and
   c. means for obtaining the difference between the signals appearing at the nodes of the first low-pass spatial filter and the nodes of the second low-pass spatial filter.

23. A system as claimed in claim 22 wherein:
   a. said difference obtaining means is connected to the nodes of said first and second low-pass spatially-invariant filters to form a summing plane whose output forms the outputs of the spatial band-pass filter.

24. A system as claimed in claim 23 wherein said spatially-invariant band-pass filter further comprises:
   a. a plurality of resistive elements interconnecting the nodes in the first low-pass spatial filter to form a first resistive plane; and
   b. a plurality of resistive elements interconnecting the nodes in the second low-pass spatial filter to form a second resistive plane.

25. A system as claimed in claim 24 wherein:
   a. said plurality of resistive elements in the first resistive plane comprise:
      1. a plurality of resistors connected in a hexagonal pattern, one resistor interconnecting each node in the plane with each adjacent node; and
   b. said plurality of resistive elements in the second resistive plane comprise:
      1. a plurality of resistors connected in a hexagonal pattern, one resistor interconnecting each node in the plane with each adjacent node.

26. A system as claimed in claim 25, wherein said peak detecting means comprises:
   a. a line-element peak detector connected to the output nodes of said spatially-invariant filter and identifying a peak line element wherever for each of said two pairs of output nodes the two signals at one pair of adjacent output nodes are both greater than the two signals at the other pair of adjacent output nodes.

27. A system as claimed in claim 26, wherein:
   a. said line element peak detector includes a plurality of comparator circuits connected to said output nodes, each comparator circuit having its input connected to two of said output node pairs to determine if the signals on one pair are both greater than the signals on the other pair, thereby to identify a peak line element.

28. A system as claimed in claim 27 further comprising:
   a. a threshold signal source,
   b. a threshold circuit provided for each comparator circuit and connected to be responsive to the signals on the two associated output node pairs and the threshold signal, for preventing said line element peak detector from identifying a peak line element when said threshold signal source is greater than the signals applied on the four associated output nodes.

29. A system as claimed in claim 25 wherein said spatially-invariant band-pass filter further comprises:
   a. a resistor connected between each node and ground in both the first and second resistive planes; and
   b. a resistor interconnecting each node in the first resistive plane with its corresponding node in the second resistive plane.

30. A system as claimed in claim 29 wherein said photoelectric means comprises:
   a. an array of light sensors, the output of each light sensor connected to a respective node in the first resistive plane.

31. A system as claimed in claim 30 wherein:
   a. said plurality of load impedances are resistors.

32. A system as claimed in claim 31 wherein said difference obtaining means includes:
   a. a plurality of differential amplifiers arranged in a hexagonal array, the input of each of said amplifiers being connected to a corresponding node in the first and second resistive planes.

33. A system as claimed in claim 32 wherein said sensors, nodes in said first resistive plane, nodes in said second resistive plane, and differential amplifiers are equal in number.

34. A system as claimed in claim 22, wherein said peak detecting means comprises:
   a. a line element peak detector connected to the output nodes of said spatially-invariant filter and identifying a peak line element wherever for each of said two pairs of output nodes the two signals at one pair of adjacent output nodes are both greater than the two signals at the other pair of adjacent output nodes.

35. A system as claimed in claim 34, wherein:
   a. said line element peak detector includes a plurality of comparator circuits connected to said output nodes, each comparator circuit having its input connected to two of said output node pairs to determine if the signals on one pair are both greater than the signals on the other pair, thereby to identify a peak line element.

36. A system as claimed in claim 35 further comprising:
   a. a threshold signal source,
   b. a threshold circuit provided for each comparator circuit and connected to be responsive to the signals on the two associated output node pairs and the threshold signal, for preventing said line element peak detector from identifying a peak line element when said threshold signal source is greater than the signals applied on the four associated output nodes.

* * * * *

UNITED STATES PATENT AND TRADEMARK OFFICE
CERTIFICATE OF CORRECTION

PATENT NO. : 3,964,021
DATED : June 15, 1976
INVENTOR(S) : Ilan Tamches

It is certified that error appears in the above-identified patent and that said Letters Patent are hereby corrected as shown below:

Claim 23, line 33 in column 20, change "spatial" to --spatially-invariant--.

Signed and Sealed this

Ninth Day of November 1976

[SEAL]

Attest:

RUTH C. MASON
*Attesting Officer*

C. MARSHALL DANN
*Commissioner of Patents and Trademarks*